(12) United States Patent
Mizrachi et al.

(10) Patent No.: US 8,259,728 B2
(45) Date of Patent: Sep. 4, 2012

(54) METHOD AND SYSTEM FOR A FAST DROP RECOVERY FOR A TCP CONNECTION

(75) Inventors: Shay Mizrachi, Hod HaSharon (IL); Eliezer Aloni, Zur Yigal (IL); Patricia Thaler, Carmichael, CA (US); Pavel Anissimov, Rison le Zion (IL); Dov Hirshfeld, Givat Shmuel (IL)

(73) Assignee: Broadcom Corporation, Irvine, CA (US)

( * ) Notice: Subject to any disclaimer, the term of this patent is extended or adjusted under 35 U.S.C. 154(b) by 706 days.

(21) Appl. No.: 11/861,008

(22) Filed: Sep. 25, 2007

(65) Prior Publication Data

US 2009/0080332 A1    Mar. 26, 2009

(51) Int. Cl.
*H04L 12/28* (2006.01)
(52) U.S. Cl. ........................................ 370/394; 370/474
(58) Field of Classification Search .................. 370/394, 370/474
See application file for complete search history.

(56) References Cited

U.S. PATENT DOCUMENTS

| | | | |
|---|---|---|---|
| 6,629,261 B1 * | 9/2003 | Chintada et al. ................... | 714/4 |
| 7,061,856 B2 * | 6/2006 | Banerjee ....................... | 370/216 |
| 2003/0112754 A1 * | 6/2003 | Ramani et al. ................. | 370/230 |
| 2006/0007935 A1 * | 1/2006 | Bennett et al. .............. | 370/395.5 |
| 2007/0121506 A1 * | 5/2007 | Wydrowski et al. ........... | 370/231 |
| 2007/0280107 A1 * | 12/2007 | Ludwig et al. ................. | 370/230 |
| 2007/0286077 A1 * | 12/2007 | Wu ............................... | 370/235 |

* cited by examiner

*Primary Examiner* — Anh-Vu Ly
*Assistant Examiner* — Matthew Hopkins
(74) *Attorney, Agent, or Firm* — Thomas, Kayden, Horstemeyer & Risley, LLP

(57) ABSTRACT

Methods and systems for a fast drop recovery for a TCP connection are disclosed. Aspects of one method may include a receiving device on a network receiving an out-of-order data. The receiving device may then signal to a transmitting device on the network, which sent the out-of-order packet, to enter a congestion alleviation mode without waiting for a delay period. The network packet transfer may be via TCP protocol, for example. The delay period may comprise a retransmission time-out period if the receiving device does not save isles. If the receiving device does save one or more isles, the delay period may be a period associated with delayed ACK. The signal may comprise a TCP option and/or an available TCP flag. The signal may also comprise, for example, three duplicate ACKs. Other similar signals may be used for networks that use other protocols than TCP. Upon receiving out-of-order data, the receiving device may, for example, send the signal and then assert a signal-sent flag if it is not already asserted. When a new packet is received in order, the signal-sent flag may be de-asserted.

30 Claims, 9 Drawing Sheets

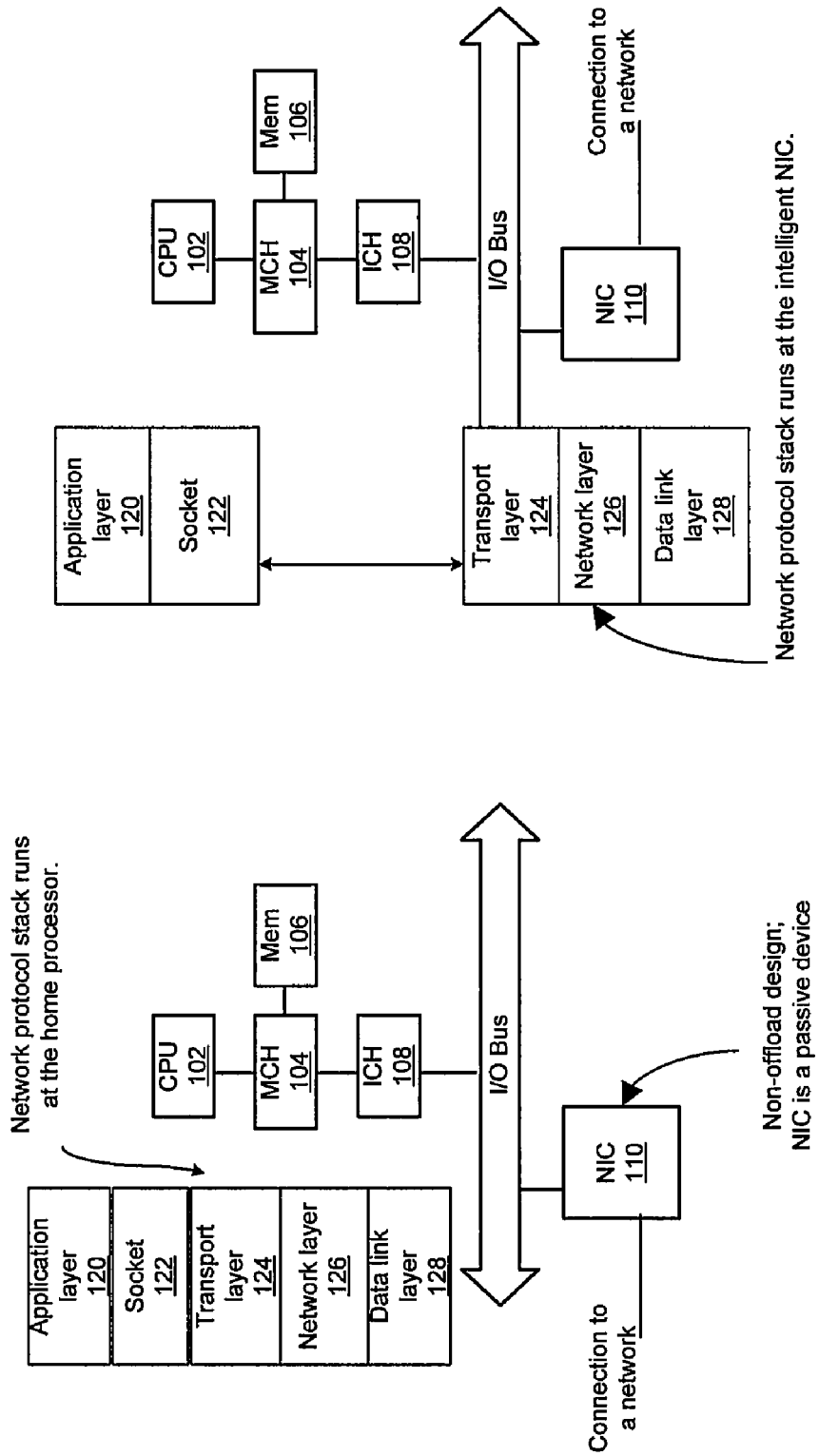

a# METHOD AND SYSTEM FOR A FAST DROP RECOVERY FOR A TCP CONNECTION

CROSS-REFERENCE TO RELATED APPLICATIONS/INCORPORATION BY REFERENCE

None.

FEDERALLY SPONSORED RESEARCH OR DEVELOPMENT

[Not Applicable]

MICROFICHE/COPYRIGHT REFERENCE

[Not Applicable]

FIELD OF THE INVENTION

Certain embodiments of the invention relate to network communication. More specifically, certain embodiments of the invention relate to a method and system for a fast drop recovery for a TCP connection.

BACKGROUND OF THE INVENTION

Use of various networks, including the Internet, has exploded in the last few years. Much of this is due to increased number of computer users who access various networks, a greater percentage of the computer users using broadband services, and proliferation of multimedia files being transferred. For example, it is common now for a computer user to transfer digital photographs, music files, and video clips that may each be several megabytes in size. To a lesser extent, in terms of number of files transferred, but not necessarily in the total number of bytes transferred, there are full-length videos that may be hundreds of megabytes in size. All this traffic may cause network congestion, and the result may be dropped packets.

A receiving network device may perceive dropped packets as holes and isles, where a hole may be one ore more sequential dropped packets and an isle may be one or more sequential received packets between two holes. In order to fill the holes, the transmitting network device may retransmit the dropped packets according to ACK messages that it receives from the receiving network device. The retransmission algorithm may often be based on "Reno" or "New Reno" algorithms.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method for a fast drop recovery for a TCP connection, substantially as shown in and/or described in connection with at least one of the figures, as set forth more completely in the claims.

Various advantages, aspects, and novel features of the present invention, as well as details of an illustrated embodiment thereof, will be more fully understood from the following description and drawings.

BRIEF DESCRIPTION OF SEVERAL VIEWS OF THE DRAWINGS

FIG. 1b is a block diagram of an exemplary system for a non-offloaded Internet protocol stack, which may be utilized in connection with an embodiment of the invention.

FIG. 1c is a block diagram of an exemplary system for an Internet protocol stack with an intelligent network interface card, which may be utilized in connection with an embodiment of the invention.

DETAILED DESCRIPTION OF THE INVENTION

Certain embodiments of the invention may be found in a method and system for a fast drop recovery for a TCP connection. Aspects of the invention may comprise a receiving device on a network that may, in response to detecting a received out-of-order packet, communicate a signal from the receiving device to a transmitting device that sent the out-of-order packet. The packet transfer on the network may be via, for example, TCP. The signal may indicate to the transmitting device to enter a congestion alleviation mode without waiting for a delay period. The delay period may comprise a retransmission time-out period if the receiving device does not save isles. The signal may comprise a TCP option and/or an available TCP flag. The signal may also comprise, for example, a plurality of duplicate ACKs. Other similar signals may be used for networks that use other protocols than TCP. Upon receiving out-of-order data, the receiving device may, for example, send the signal and then assert a signal-sent flag. When a new packet is received in order, the signal-sent flag may be de-asserted.

In instances where one or more, but not all, isles may be saved by the receiving device, the receiving device may send a signal that may indicate that an out-of-order packet may have been received. The signal may be sent, for example, after the receiving device receives retransmitted packets that fill one or more holes before a last saved isle. The transmitting device may then enter a slow start mode with a packet that sequentially follows the last saved isle. The packet that the transmitting device may start with the slow start mode may be indicated, for example, by the signal sent by the receiving device. For example, the slow start mode may initially start with a congestion window (CWND) equal to 0.5*FlightSize. The FlightSize may be, for example, the number of packets sent by the transmitting device that have not been acknowledged.

Figure 1A:
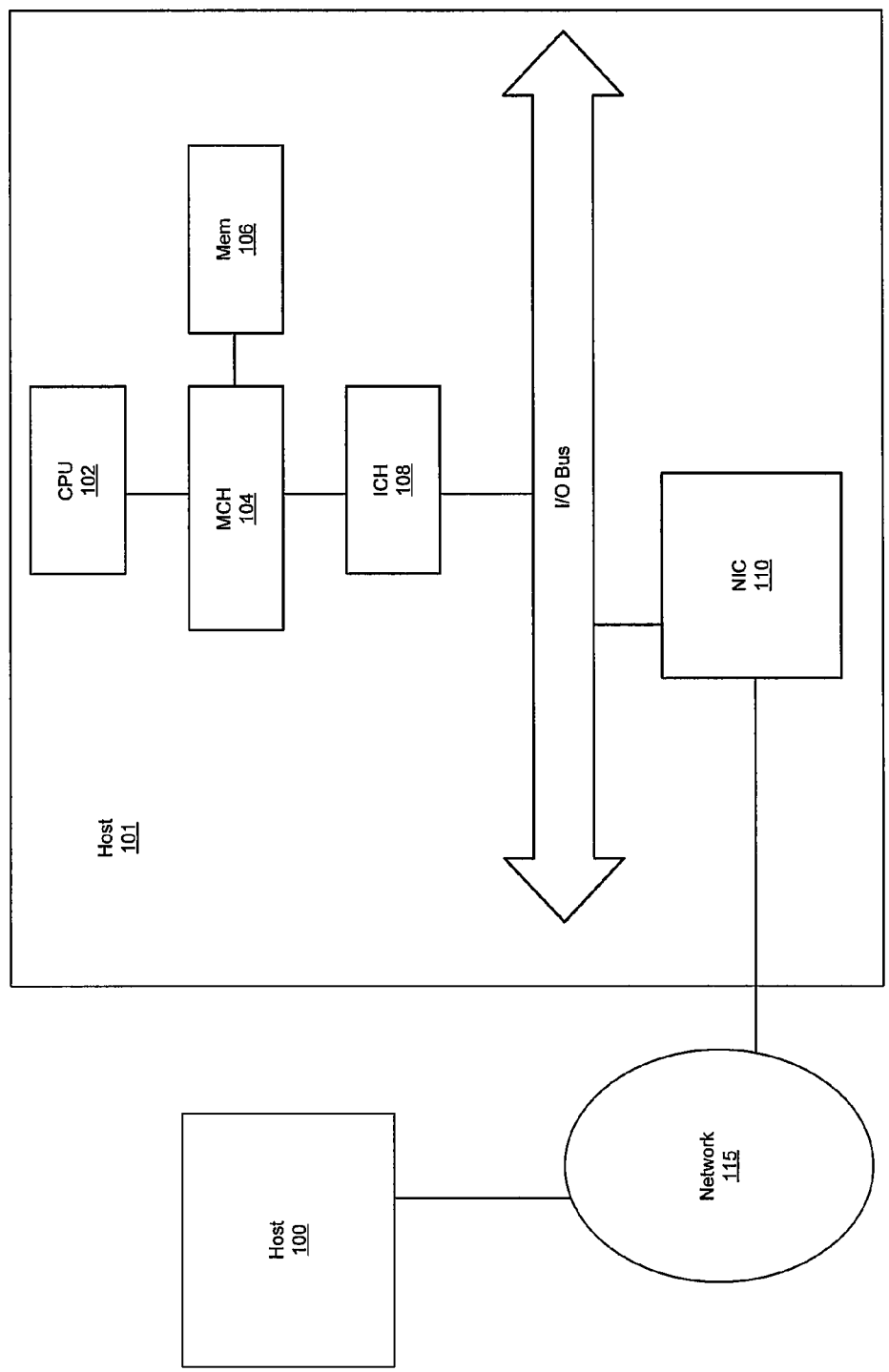
FIG. 1a is a block diagram of an exemplary communication system, in accordance with an embodiment of the invention.

FIG. 1a is a block diagram of an exemplary communication system, in accordance with an embodiment of the invention. Referring to FIG. 1a, there is shown hosts 100 and 101, and a network 115. The host 101 may comprise a central processing unit (CPU) 102, a memory interface (MCH) 104, a memory block 106, an input/output (IO) interface (ICH) 108, and a network interface card (NIC) 110. The host 100 may be functionally similar to the host 101.

The memory interface (MCH) 104 may comprise suitable circuitry and/or logic that may be adapted to transfer data between the memory block 106 and other devices, for example, the CPU 102.

The input/output interface (ICH) 108 may comprise suitable circuitry and/or logic that may be adapted to transfer data between IO devices, between an IO device and the memory block 106, or between an IO device and the CPU 102.

The network interface chip/card (NIC) 110 may comprise suitable circuitry, logic, and/or code that may be adapted to transmit and receive data from a network, for example, an Ethernet network. The NIC 110 may process received data and/or data to be transmitted. The amount of processing may be design and/or implementation dependent. Generally, the NIC 11.0 may comprise a single chip that may also utilize on-chip memory and/or off-chip memory.

In operation, the host 100 and the host 101 may communicate with each other via, for example, the network 115. The network 115 may be an Ethernet network. Accordingly, the host 100 and/or 101 may send and/or receive packets via a network interface card, for example, the NIC 110. For example, the CPU 102 may fetch instructions from the memory block 106 and execute those instructions. The CPU 102 may additionally store within, and/or retrieve data from, the memory block 106. For example, a software application running on the CPU 102 may have data to transmit to a network, for example, the network 115. An example of the software application may be email applications that are used to send email sent between the hosts 100 and 101.

Accordingly, the CPU 102 in the host 101 may process data in an email and communicate the processed data to the NIC 110. The data may be communicated to the NIC 110 directly by the CPU 102. Alternatively, the data may be stored in the memory block 106. The stored data may be transferred to the NIC 110 via, for example, a direct memory access (DMA) process. Various parameters needed for the DMA, for example, the source start address, the number of bytes to be transferred, and the destination start address, may be written by the CPU 102 to, for example, the memory interface (MCH) 104. Upon a start command, the memory interface (MCH) 104 may start the DMA process. In this regard, the memory interface (MCH) 104 may act as a DMA controller.

The NIC 110 may further process the email data and transmit the email data as packets in a format suitable for transfer over the network 115 to which it is connected. Similarly, the NIC 110 may receive packets from the network 115 to which it is connected. The NIC 110 may process data in the received packets and communicate the processed data to higher protocol processes that may further process the data. The processed data may be stored in the memory block 106, via the IO interface (ICH) 108 and the memory interface (MCH) 104. The data in the memory block 106 may be further processed by the email application running on the CPU 102 and finally displayed as a, for example, text email message for a user on the host 101.

While an embodiment of the invention may have been described as comprising the MCH 104, the invention need not be so limited. For example, the CPU 102 may comprise some or all of the functionality of the MCH 104. This may be, for example, when the CPU 102 also comprises memory controller functionality.

FIG. 1b is a block diagram of an exemplary system for a non-offloaded Internet protocol stack, which may be utilized in connection with an embodiment of the invention. Referring to the FIG. 1b, there is shown the host 101 that may comprise the CPU 102, the MCH 104, the memory block 106, the ICH 108, and the NIC 110. There is also shown an application layer 120, a socket 122, a transport layer 124, a network layer 126, and a data link layer 128.

The application layer 120, the transport layer 124, the network layer 126, and the data link layer 128 may be part of a protocol stack for receiving and transmitting data from a network. The protocol stack may be, for example, the Internet protocol (IP) suite of protocols used by the Internet. The IP suite of protocols may comprise application layer protocols, transport layer protocols, a network layer protocols, data link layer protocols, and physical layer protocols. The socket 122 may comprise a software process that may allow transfer of data between two other software processes. Accordingly, the socket 122 may be viewed as a conduit for transfer of data between the application layer 120 and the transport layer 124. The physical layer may be the medium that connects one host on a network to another host. For example, the medium may be cables that serve to conduct the network signals in a network, for example, an Ethernet network.

When receiving an email, for example, the email may be received by the NIC 110 from the physical layer, for example, the Ethernet media, as a series of packets. The NIC 110 may store the received packets to the memory bock 106. The CPU 102 may, for example, execute the data link layer 128 protocol, for example, to remove the physical layer framing from each packet. The framing may comprise node addresses, and bit patterns that may indicate the start and end of each packet. The CPU 102 may then, for example, execute the protocols for the next OSI layer in the protocol stack. This OSI layer may be, for example, network layer 126, and may comprise removing the network related information from each packet that may be used to route the packets from one network to another. The next layer of protocol to be executed may be the transport layer 124. The transport layer 124 may, for example, ensure that all packets for a file have been received, and may assemble the various packets in order.

The assembled file may then be processed by the application layer 120 protocol. The application layer 120 protocol may be a part of an application, for example, an email application. The application layer 120 protocol may, for example, ensure that data format may be the format used by the application. For example, the characters in the email message may have been encoded using the ASCII format, rather than the EBCDIC format.

When transmitting data to the network, the protocol stack may be traversed in the other direction. For example, from the application layer 120 to the transport layer 124, then to the network layer 126, then to the data link layer 128, and finally to the physical layer. The application layer 120 may encode the application file to a standard format for this type of application. The transport layer 124 may separate the file into packets, and each packet may be identified so that the corresponding transport layer at the receiving host may be able to re-assemble the received packets in order. The network layer 126 may encapsulate the packets from the transport layer 124 in order to be able to route the packets to a desired destination, which may be in a different network. The data link layer 128 may provide framing for the packets so that they may be addressed to a specific node in a network.

FIG. 1c is a block diagram of an exemplary system for implementing an Internet protocol stack with an intelligent network interface card, which may be utilized in connection with an embodiment of the invention. Referring to FIG. 1c, there is shown a diagram similar to the diagram in FIG. 1b. However, the protocol stack may be separated. For example, the transport layer 124, the network layer 126, and the data link layer 128 may be executed by the NIC 110, rather than by the CPU 102 as in FIG. 1b. The NIC 110 may be referred to as an intelligent NIC since it may handle some of the protocol stack processing, for example, the transport layer 124, internet protocol (IP) for the network layer 126, and Ethernet protocol for the data link layer 128. This may free the CPU 102, which may only have to process the socket 122 and the application layer 120 protocol, to allocate more processing resources to handle application software. Accordingly, the performance of the processor may be increased so that it may more efficiently execute application software. Implementations of intelligent NIC, for example, the NIC 110, may rely on embedded processors and firmware to handle network protocol stack.

Figure 2:
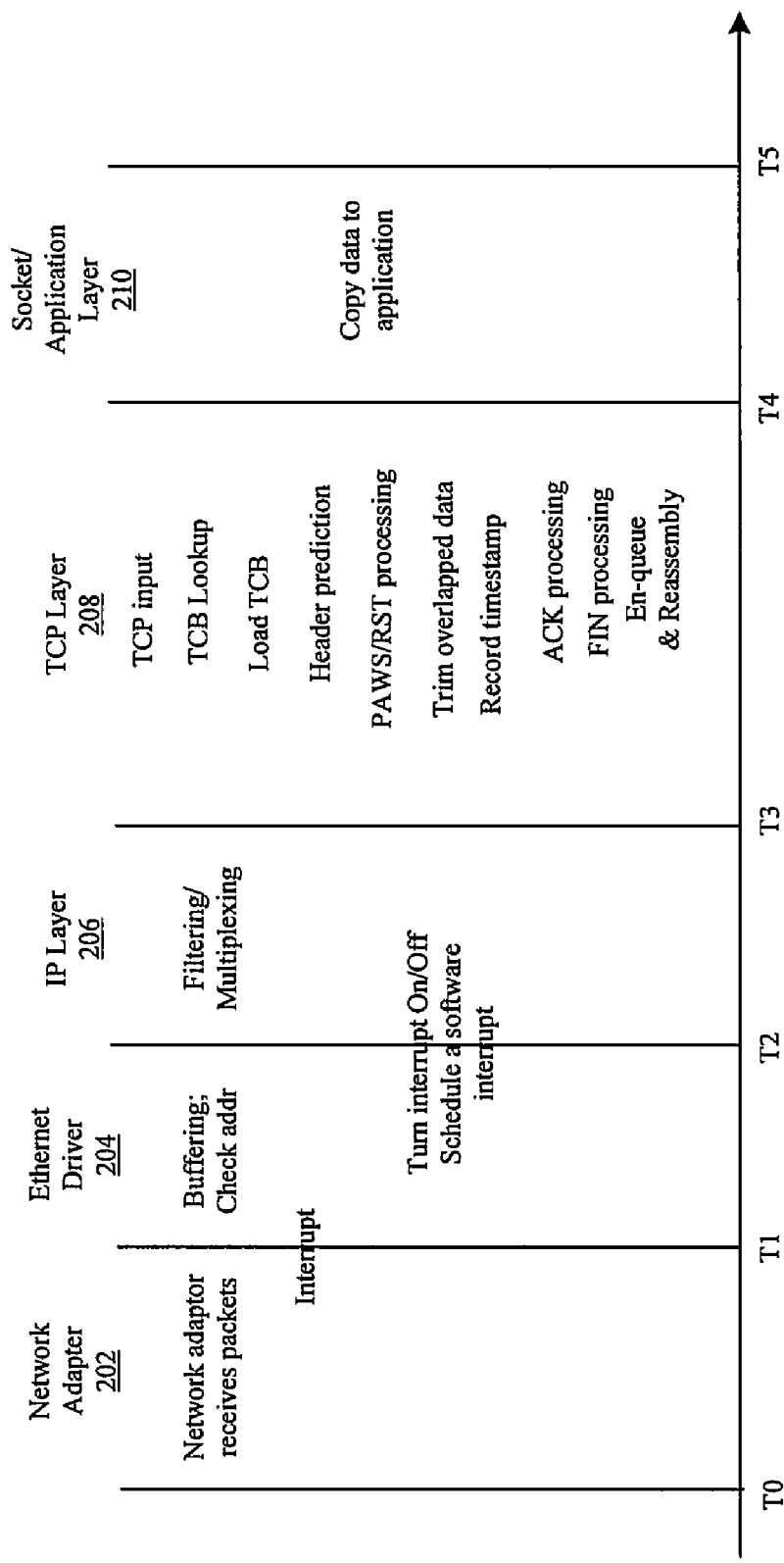
FIG. 2 is a diagram illustrating an implementation of a TCP/IP stack in a modern computer system, which may be utilized in connection with an embodiment of the invention.

FIG. 2 is a diagram illustrating an implementation of a TCP/IP stack in a modern computer system, which may be used in connection with an embodiment of the invention. Referring to FIG. 2, there is shown a physical layer 202, a data link layer 204, an IP layer 206, a TCP layer 208, and an application layer 210 of the TCP/IP protocol stack. Also shown are steps taken in the various layers 202, 204, 206, 208, and 210 of the TCP/IP protocol stack during the time period from a time instance T0 to a time instance T5. The steps in the protocol stack may be executed by the host processor, for example, the CPU 102.

After the time instance T0, a network controller, for example, the NIC 110, may receive data from a network, for example, an Ethernet network. The data packets received by the NIC 110 are destined for NIC 110 if a MAC address in those packets is the same as the MAC address for the NIC 110.

At time instance T1, the NIC 110 may interrupt the CPU 102 to notify it of received packets. The interrupt to the CPU 102 may trigger a context switch, which may comprise saving various information for the current process being executed and interrupted, and loading new information for the various registers. The information in the registers involved in the context switch may include, for example, the general purpose registers, program counters, stack pointers, etc, in the CPU 102. New information may have to be loaded to service the interrupt. In this regard, the context switch may consume valuable CPU processing time.

As part of an interrupt service routine, an Ethernet driver 204, which may be a portion of the data link layer 128 (FIG. 1b), may remove, for example, Ethernet framing information. The Ethernet driver 204 may allocate a secondary control buffer to track the received packets. Allocation and initialization of the control buffer may cause a number of cache misses. When a cache miss occurs, the processor performance may degrade significantly while waiting for data from external memory. The Ethernet driver 204 may also need to replenish the network adapter with receive buffers in order to make received packets available for further protocol processing.

The Ethernet driver 204 may then insert the received packet in an input queue of the receive buffer, and schedule a software interrupt so that the protocol process may be continued later. The software interrupt may be scheduled at, for example, a time instance T2.

The IP layer 206, which may initiate execution due to the software interrupt set by the Ethernet driver 204 at time instance T2, may be the network layer 126 (FIG. 1b). The IP layer 206 may comprise validating that the local host, for example, the host 101, may be the destination. The IP layer 206 may also de-multiplex packets to an upper layer, for example, the transport layer 124, in the protocol stack according to the transport protocol. For example, the transport layer 124 may comprise a plurality of protocols, for example, the TCP and user datagram protocol (UDP). The TCP may ensure that data sent by a host, for example, the host 100, may be received in the same order by another host, for example, the host 101, and without any packets missing. The UDP, however, may not provide the reliability and ordering guarantees that are provided by the TCP layer. The packets may arrive out of order or go missing without notice. As a result, however, the UDP may provide a faster and more efficient data transfer for many lightweight or time-sensitive purposes. Some data transfers that may use UDP may be streaming media applications, Voice over IP, and/or online games.

At time instance T3, the TCP layer 208, which may be, for example, the transport layer 124, may start with a session lookup operation for the TCP Control Block (TCB). Each transport layer 124 associated with a network node may maintain state information for each TCP connection. This information may usually be in a data structure that may contain information about the connection state, its associated local process, and feedback parameters about the connection's transmission properties. The TCB may usually be maintained on a per-connection basis. Once the TCB information for the packet is found, or is generated for a new connection, the TCP layer 208 for the receiving host, for example, the host 101 may acknowledge receipt of the packet.

The transmitting host, for example, the host 100, may re-send a packet for which the receiving host may not have sent an acknowledgement after a time-out period. For example, when the TCP layer 208 for the receiving host 101 determines that a file is complete according to protocol, it may perform reassembly and en-queue the received packets to a socket receive buffer. The socket receive buffer may essentially be a linked list that comprises all the received packets in the correct order. The data in the socket receive buffer may be communicated to the application layer by use of the socket 122 at time instance T4. The data in the socket receive buffer may be copied to application memory by the application layer 120.

During the time period from the time instance T3 to the time instance T4, the receiving host may also make header prediction to be able to do fast processing of the next received TCP packet for the respective TCP session. If the received TCP packet is not the predicted packet, additional processing may need to take place. For example, there may need to be protection against wrapped sequence processing in the event that the sequence number may have wrapped around after reaching a maximum value. Additionally, multiple packets may have duplicate or overlapped information, for example, if the sending host sent additional packets because it did not receive acknowledgements for transmitted packets. The duplicated data may need to be trimmed in order to avoid redundancy.

A time stamp may also be generated for each packet received in order help keep track of the TCP packets. There may also be acknowledgement processing of received TCP packets. Also, if the transmitting host requests an end of the TCP session, there may be processing to terminate the TCP session. Finally, there may be en-queuing of received data and in-order re-assembly of the data received.

Figure 3:
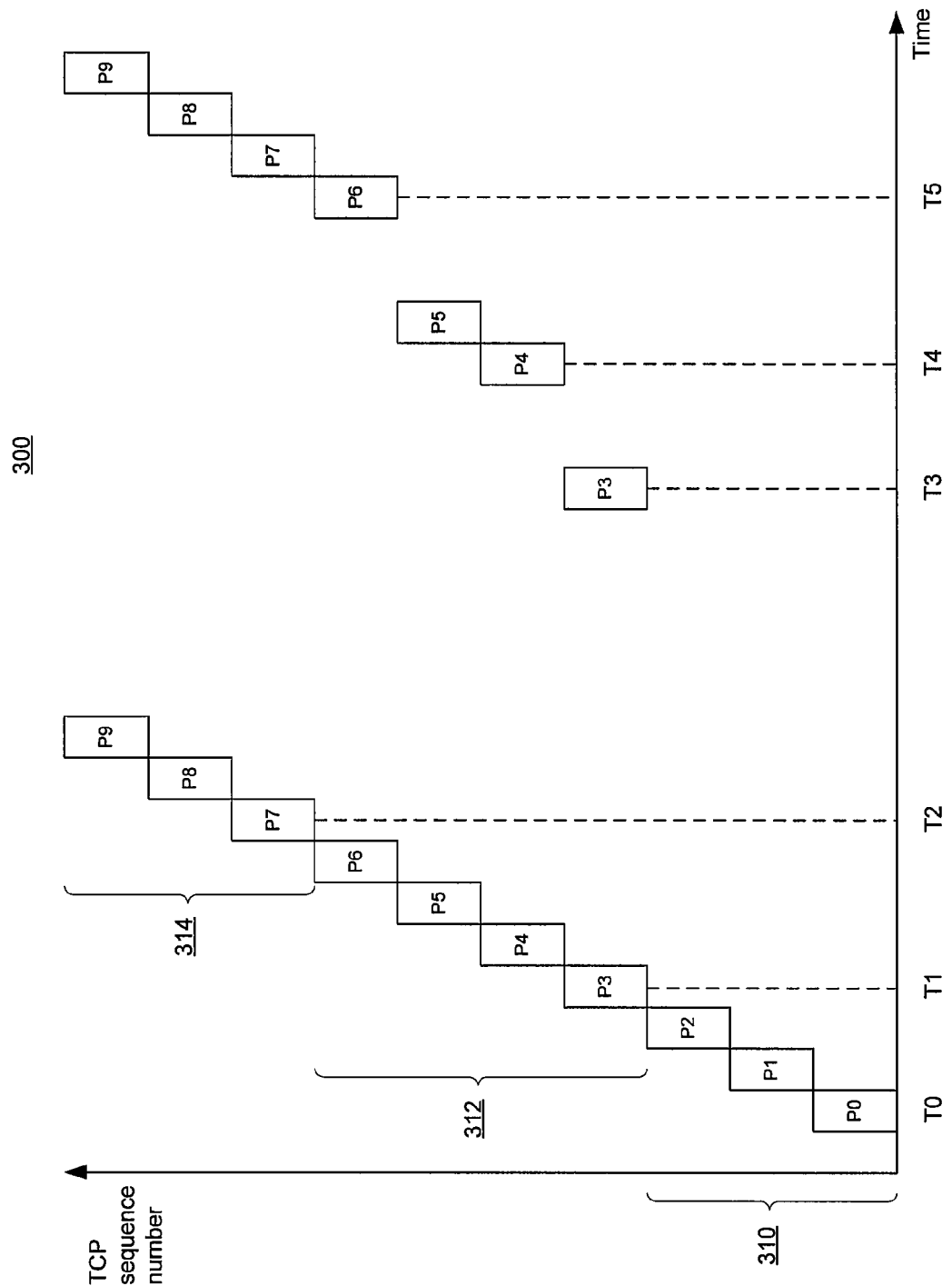
FIG. 3 is a diagram illustrating an exemplary TCP data transfer where isles are not saved, which may be utilized in connection with an embodiment of the invention.

FIG. 3 is a diagram illustrating an exemplary TCP data transfer where isles are not saved, which may be utilized in connection with an embodiment of the invention. Referring to FIG. 3, there is shown a diagram 300 where the horizontal axis indicates time and the vertical axis indicates order in which a transmitting device sends packets. The order of sent packets may generally refer to packets transmitted by the transmitting device. For example, the sent packets may be the originally transmitted packets and also to the re-transmitted packets. A transmitting device may transmit, for example, the packet groups 310, 312, and 314 in sequence starting at time instance T0. With respect to FIG. 3, the host 100 may also be referred to as the transmitting device 100. The packet group 310 may comprise, for example, packets P0, P1, and P2. The packet group 312 may comprise, for example, packets P3, P4, P5, and P6, and the packet group 314 may comprise, for example, packets P7, P8, and P9.

The packet group 310 may be received by a receiving device, which may be, for example, the host 101. With respect to FIG. 3, the host 101 may also be referred to as the receiving device 101. However, the packet group 312 may be dropped by a network switch (not shown). Accordingly, the receiving device 101 may receive out-of-order packets P7, P8, and P9 in the packet group 314 after a time instance T2. The receiving device 101 may send acknowledgements for the received packets P0, P1, and P2 in the packet group, but it may not send acknowledgements for the dropped packets P3, P4, P5, and P6 in the packet group 312.

The packets P7, P8, and P9 in the packet group 314 may be received by the receiving device 101. However, since they are received out-of-order, and the receiving device 101 may not save isles of packets, the packets P7, P8, and P9 in the packet group 314 may be dropped and no acknowledgement may be sent for those packets. Accordingly, the transmitting device 100 may have no indication that it may need to re-transmit the dropped packets. The transmitting device 100 may then wait for a retransmission time-out period (RTO), whose length may depend on a specific protocol used. A TCP retransmission time out (RTO) may be, for example, 1 second. Accordingly, the transmitting device 100 may wait as long as 1 second from the time that the packet P3 in the packet group 312 was transmitted at time instance T1.

At time instance T3, which may be approximately 1 second after the time instance T1, the transmitting device 100 may time out and a slow start mode may be entered. The transmitting device 100 may transmit one packet initially at time instance T3, where the packet sent may be the oldest packet without an acknowledgement. Accordingly, the packet P3 in the packet group 312 may be re-transmitted. After the time instance T3, the transmitting device 100 may receive an acknowledgement for the packet P3 in the packet group 312 from the receiving device 101, and the transmitting device 100 may send more packets. For example, the transmitting device 100 may send packets P4 and P5 in the packet group 312 and wait for acknowledgements for these packets before transmitting any more packets.

The transmitting device 100 may receive acknowledgements for the packets P4 and P5 in the packet group 312 from the receiving device 101 after the time instance T4. Accordingly, the transmitting device 100 may transmit the packets P6, P7, P8, and P9 in the packet group 314. If the receiving device 101 receives the packets P6, P7, P8, and P9 in the packet group 314 and sends acknowledgement that is received by the transmitting device 100, the transmitting device 100 and the receiving device 101 may be synchronized. The number of packets transmitted initially at a slow start mode, and after each acknowledgement for the packets sent in the slow start mode, may be design and/or implementation dependent.

Figure 4:
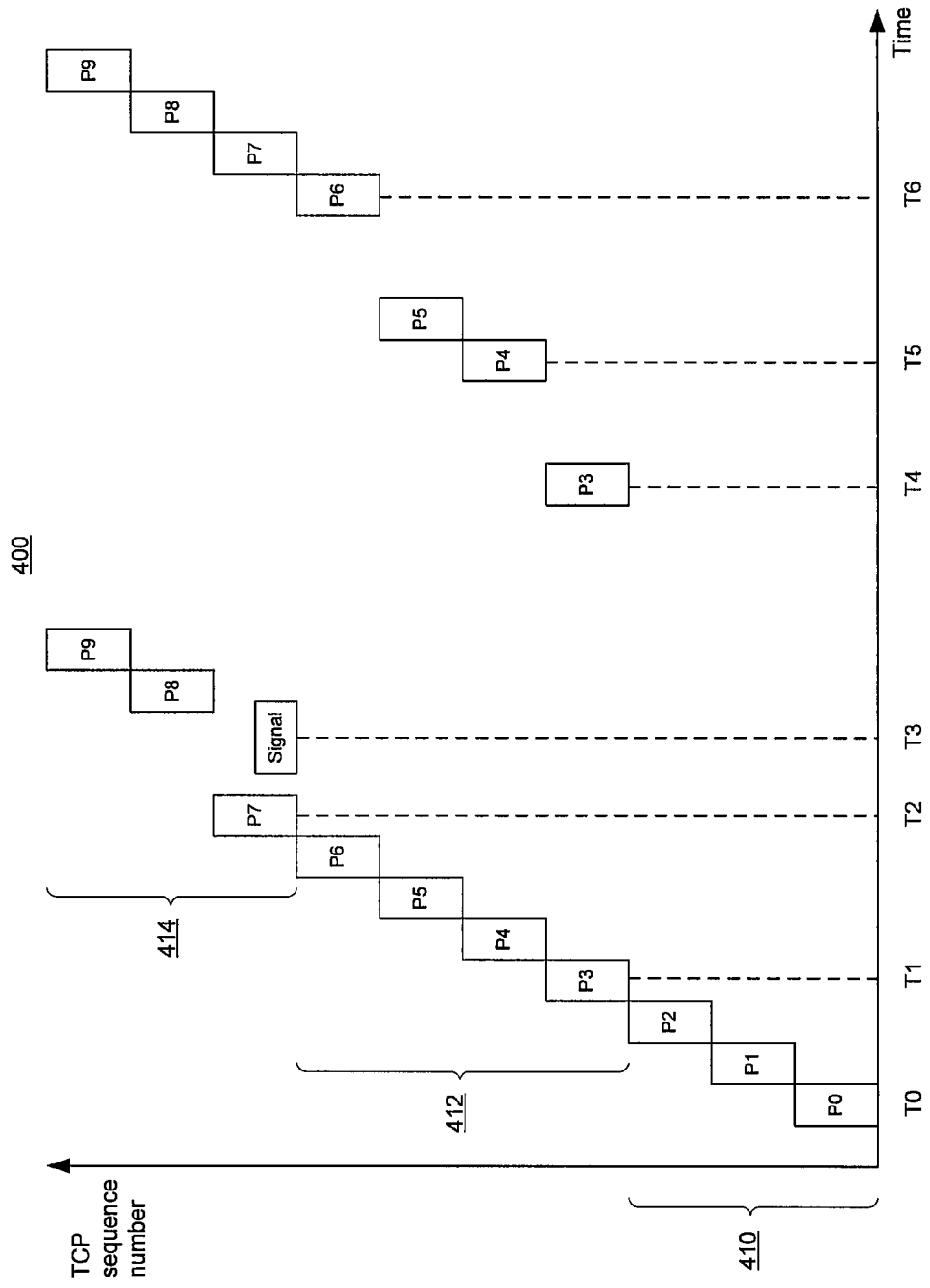
FIG. 4 is a diagram illustrating an exemplary TCP data transfer where isles are not saved, but incorporates sending an out-of-order signal, in accordance with an embodiment of the invention.

FIG. 4 is a diagram illustrating an exemplary TCP data transfer where isles are not saved, but incorporates sending an out-of-order signal, in accordance with an embodiment of the invention. Referring to FIG. 4, there is shown a diagram 400 where the horizontal axis indicates time and the vertical axis indicates order in which a transmitting device sends packets. The transmitting device, which may be, for example, the host 100, may transmit, for example, the packet groups 410, 412, and 414 starting at time instance T0. With respect to FIG. 4, the host 100 may also be referred to as the transmitting device 100. The packet group 410 may comprise, for example, packets P0, P1, and P2. The packet group 412 may comprise, for example, packets P3, P4, P5, and P6, and the packet group 414 may comprise, for example, packets P7, P8, and P9.

The packet group 410 may be received by a receiving device, which may be, for example, the host 101. With respect to FIG. 4, the host 101 may also be referred to as the receiving device 101. However, the packet group 412, which may have been transmitted at time instance T1, may be dropped by a network switch (not shown). Accordingly, the receiving device 101 may receive out-of-order packets P7, P8, and P9 in the packet group 414, which may have been received after the time instance T2. The receiving device 101 may send acknowledgements for the received packets P0, P1, and P2 in the packet group 410, but it may not send acknowledgements for the dropped packets P3, P4, P5, and P6 in the packet group 412.

The packets P7, P8, and P9 may be received by the receiving device 101 starting after the time instance T2. However, since they are received out-of-order, and the receiving device 101 may not save isles of packets, the packets P7, P8, and P9 in the packet group 414 may be dropped. A signal may be sent at time instance T3 to the transmitting device 100 to indicate that out-of-order packets may have been received. The signal may comprise, for example, three acknowledgement messages indicating that the next packet that should be transmitted may be packet P3 in the packet group 412, which may be the first missing packet. Accordingly, the transmitting device 100 may enter a slow start mode. The signal may also comprise, for example, TCP flags or TCP options.

The transmitting device 100 may initially transmit one packet at time instance T4, where the packet re-transmitted may be the packet P3 in the packet group 412. The transmitting device 100 may receive an acknowledgement for the packet P4 in the packet group 412 from the receiving device 101, and the transmitting device 100 may send more packets. For example, the transmitting device 100 may send packets P4 and P5 in the packet group 412 at the time instance T5 and wait for acknowledgements for these packets before transmitting any more packets. Accordingly, when no isles are saved, bandwidth and latency may be improved since the transmitting device may not have to wait for the RTO as described with respect to FIG. 3. For example, the time period from the time instance T2 to the time instance T4 with respect to FIG. 4, which may be tens or hundreds of microseconds, may be much less than the time period from the time instance T2 to the time instance T3 with respect to FIG. 3, which may be hundreds of milliseconds.

The transmitting device 100 may receive acknowledgements for the packets P4 and P5 in the packet group 412 from the receiving device 101. Accordingly, the transmitting device 100 may transmit the packets P6, P7, P8, and P9 in the packet groups 412 and 414 at time instance T6. If the receiving device 101 receives the packets P6, P7, P8, and P9 in the packet groups 412 and 414, the receiving device 101 may send an acknowledgement to the transmitting device 100. When the transmitting device 100 receives the acknowledgement, the transmitting device 100 and the receiving device 101 may be synchronized. The number of packets initially transmitted at a slow start mode, and after each acknowledgement for the packets sent in the slow start mode, may be design and/or implementation dependent.

Figure 5:
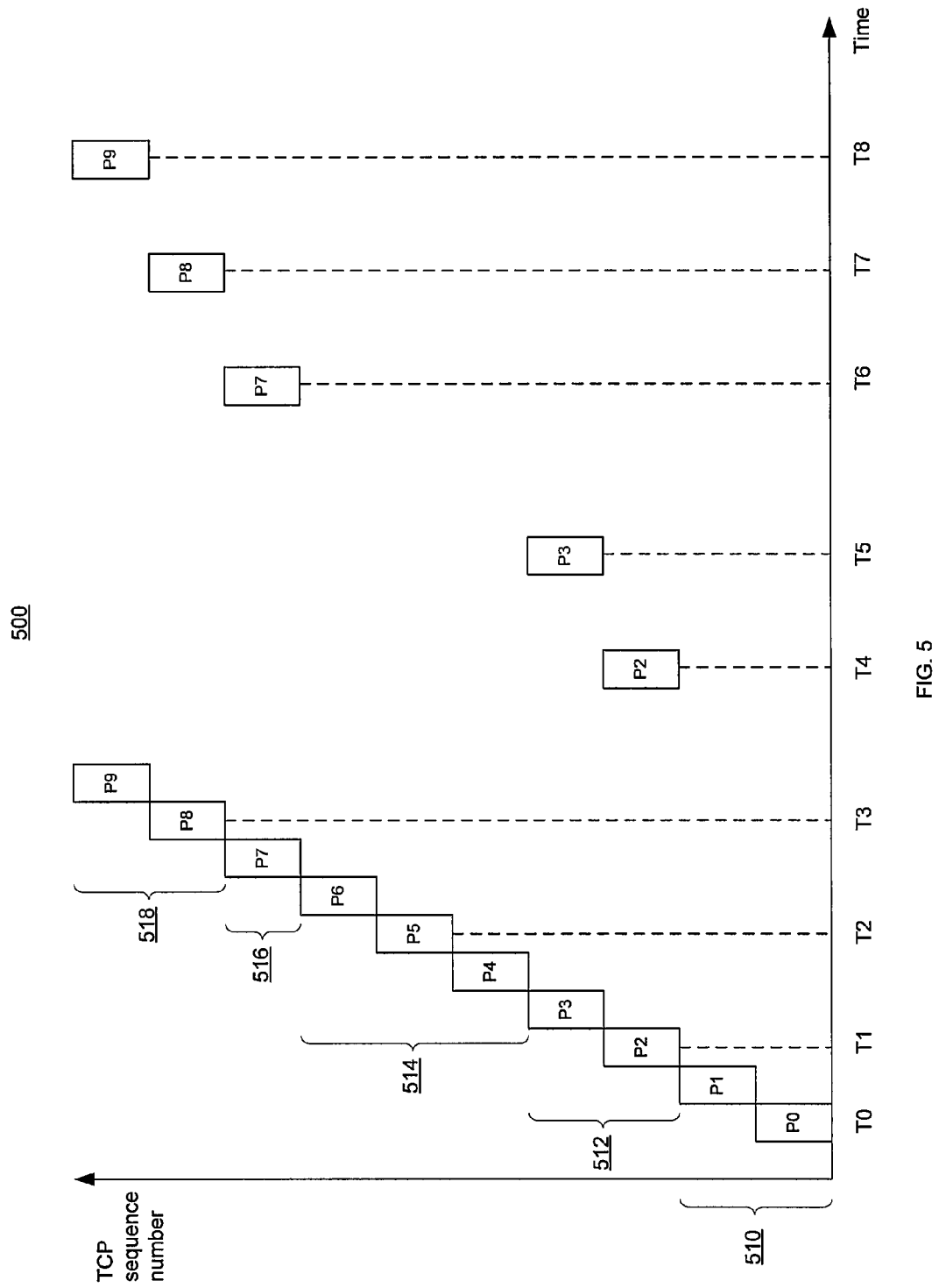
FIG. 5 is a diagram illustrating an exemplary TCP data transfer where one or more isles are saved, which may be utilized in connection with an embodiment of the invention.

FIG. 5 is a diagram illustrating an exemplary TCP data transfer where one isle is saved, which may be utilized in connection with an embodiment of the invention. Referring to FIG. 5, there is shown a diagram 500 where the horizontal axis indicates time and the vertical axis indicates order in which a transmitting device sends packets. The transmitting device, which may be, for example, the host 100, may transmit, for example, the packet groups 510, 512, 514, 516, and 518 starting at time instance T0. With respect to FIG. 5, the host 100 may also be referred to as the transmitting device 100. The packet group 510 may comprise, for example, packets P0 and P1, and the packet group 512 may comprise, for example, packets P2 and P3. The packet group 514 may comprise, for example, packets P4, P5, and P6, the packet group 516 may comprise, for example, packets P7, and the packet group 518 may comprise, for example, packets P8 and P9.

The packet group 510 may be transmitted at time instance T0, and the packets P0 and P1 in the packet group 510 may be received by a receiving device, which may be, for example, the host 101. With respect to FIG. 5, the host 101 may also be referred to as the receiving device 101. However, the packet group 512, which may have been transmitted at time instance T1, may be dropped by a network switch (not shown). Accordingly, the receiving device 101 may receive out-of-order packets P4, P5, and P6 in the packet group 514. The receiving device 101 may send acknowledgements for the received packets P0 and P1 in the packet group 510, but it may not send acknowledgements for the dropped packets P2 and P3 in the packet group 512.

The packets P4, P5, and P6 in the packet group 514 may be received by the receiving device 101. Since isles of packets may be saved, the packets P4, P5, and P6 in the packet group 514 may be saved by the receiving device 101. Acknowledgement may be sent for these packets, where each acknowledgement may indicate that the next packet to be sent may be the packet P2 in the packet group 512. The packet P7 in the packet group 516 may also be dropped by the network switch (not shown). The packets P8 and P9 in the packet group 518 may then be received after the time instance T3. For exemplary purposes, it may be assumed that only one isle of data may be saved by the receiving device 101. Accordingly, the receiving device 101 may drop the received packets P8 and P9 in the packet group 518 without sending acknowledgements.

Upon receiving the duplicate packet acknowledgements indicating that the next packet to be transmitted may be the packet P2 in the packet group 512, the transmitting device 100 may enter a retransmit phase where single packets may be sent. The next packet may not be sent until after an acknowledgement is received for the previous packet sent. Accordingly, the packet P3 in the packet group 512 may not be sent until an acknowledgement is received for the packet P2 in the packet group 512.

When the packet P3 in the packet group 514 is received, the receiving device 101 may send an acknowledgement that may indicate that the next packet to be sent may be the packet P7 in the packet group 516, since the isle of packets P5 and P6 in the packet group 514 may have been saved. In this manner, the transmitting device 100 may next re-transmit the packets P7, P8, and P9 in the packet groups 516 and 518. It may be noted that the retransmission times between the packets P7, P8 and P9 may be large. For example, in a TCP implementation using the new Reno algorithm, the transmitting device may send the packet P8 after receiving an acknowledgment for the packet P7. Similarly, the packet P9 may be sent after receiving an acknowledgment for the packet P8. However, the receiving device 101 may delay sending the acknowledgments according to the TCP "delayed-ACK," which may be sent, for example, if 0.2 seconds have elapsed since the receipt of the last packet and/or if no acknowledgment was sent for a previously received packet. Accordingly, the delay may be 200 mS for each retransmitted packet. If the new Reno algorithm, or other similar algorithms such as TCP selective acknowledgement (SACK) is not used, the delay may be even more. The delay may be, for example, on the order of a second for the TCP retransmission time out (RTO). Accordingly, the time between each retransmission may be 0.2 sec, and may result in reduced throughput and increased latency.

The acknowledgement to the packet P9 in the packet group 518 may indicate that a packet P10 may be sent next. Since the transmitting device 100 may have saved data that indicates that it had initially transmitted packet P9 in the packet group 518, the transmitting device 100 may now exit the retransmit phase and resume normal transmission. Normal transmission may comprise, for example, a slow start mode. Normal transmission mode may be design and/or implementation dependent.

Figure 6:
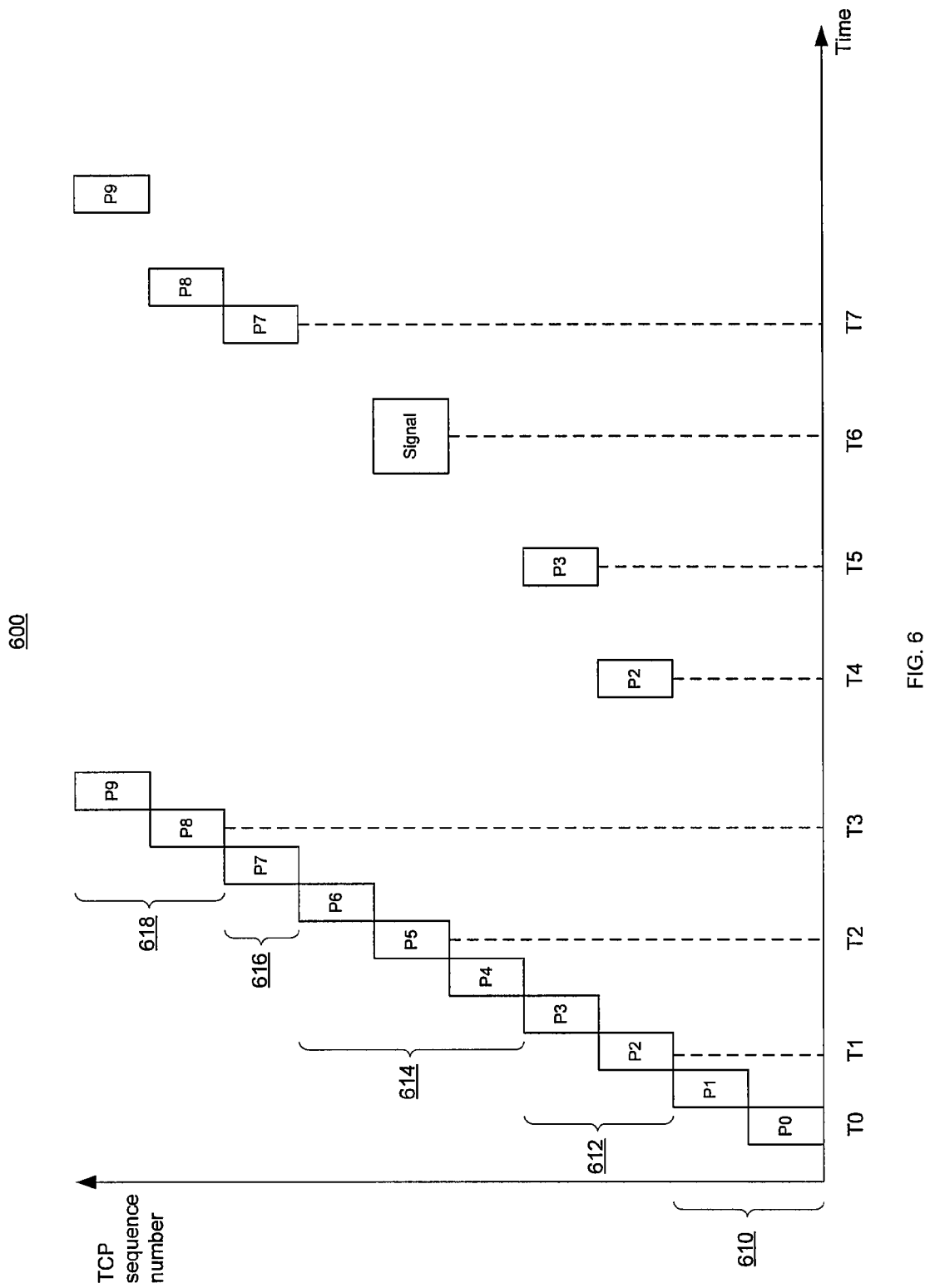
FIG. 6 is a diagram illustrating an exemplary TCP data transfer where one or more isles, but not all isles, are saved, and incorporates sending an out-of-order signal, in accordance with an embodiment of the invention.

FIG. 6 is a diagram illustrating an exemplary TCP data transfer where one or more isles, but not all isles, are saved, and incorporates sending an out-of-order signal, in accordance with an embodiment of the invention. Referring to FIG. 6, there is shown a diagram 600 where the horizontal axis indicates time and the vertical axis indicates order in which a transmitting device sends packets. The transmitting device, which may be, for example, the host 100, may transmit, for example, the packet groups 610, 612, 614, 616, and 618 starting at time instance T0. With respect to FIG. 6, the host 100 may also be referred to as the transmitting device 100. The packet group 610 may comprise, for example, packets P0 and P1, and the packet group 612 may comprise, for example, packets P2 and P3. The packet group 614 may comprise, for example, packets P4, P5, and P6, the packet group 616 may comprise, for example, packets P7, and the packet group 618 may comprise, for example, packets P8 and P9.

The packet group 610 may be transmitted at time instance T0, and the packets P0 and P1 in the packet group 610 may be received by a receiving device, which may be, for example, the host 101. With respect to FIG. 6, the host 101 may also be referred to as the receiving device 101. However, the packet group 612, which may have been transmitted at time instance T1, may be dropped by a network switch (not shown). Accordingly, the receiving device 101 may receive out-of-order packets P4, P5, and P6 in the packet group 614. The receiving device 101 may send acknowledgements for the received packets P0 and P1 in the packet group 610, but it may not send acknowledgements for the dropped packets P2 and P3 in the packet group 610.

The packets P4, P5, and P6 in the packet group 614 may be received by the receiving device 101. Since isles of packets may be saved, the packets P4, P5, and P6 in the packet group 614 may be saved by the receiving device 101. Acknowledgement may be sent for these packets, where each acknowledgement may indicate that the next packet to be sent may be the packet P2 in the packet group 610. The packet P7 in the packet group 616 may also be dropped by the network switch (not shown). The packets P8 and P9 in the packet group 618 may then be received after the time instance T3. For exemplary purposes, it may be assumed that only one isle of data is saved by the receiving device 101. Accordingly, the receiving device 101 may drop the received packets P8 and P9 without sending acknowledgements. However, various embodiments of the invention may be used with receiving entities that may save more than one isle of packets. The number of isles of packets that may be saved may be design and/or implementation dependent.

However, various embodiments of the invention used in the receiving device 101 may assert a flag that may indicate that an isle of data may have been dropped. This flag may be used to determine whether to send a signal to the transmitting device 100 indicating that data may have been dropped.

Upon receiving the duplicate packet acknowledgements indicating that the next packet to be transmitted may be the packet P2 in the packet group 612, the transmitting device 100 may enter a retransmit phase where single packets may be sent. The next packet may not be sent until after an acknowledgement is received for the previous packet sent. Accordingly, the packet P3 in, the packet group 612 may not be sent until an acknowledgement is received for the packet P2 in the packet group 612.

When the packet P3 in the packet group 612 is received, the receiving device 101 may send a signal that may indicate that the transmitting device 100 may enter a slow start mode. This may be because, for example, the receiving device may have saved packets P4, P5, and P6 in the packet group 614. The signal may comprise, for example, three acknowledgement messages indicating that the next packet that should be transmitted may be packet P7. Accordingly, the transmitting device 100 may enter a slow start mode. The transmitting device 100 may also start with a congestion window (CWND) equal to 0.5*FlightSize, where FlightSize may be, for example, the number of packets sent by the transmitting device to which it has not received an acknowledge.

In this exemplary case, the FlightSize may be 3 since the transmitting device may not yet have received acknowledgements for the packets P7, P8, and P9 in the packet groups 616 and 618. Accordingly, the CWND may start with a value of 2, where the value may increase with each acknowledgement received. Determination of CWND may be design and/or implementation dependent.

Figure 7:
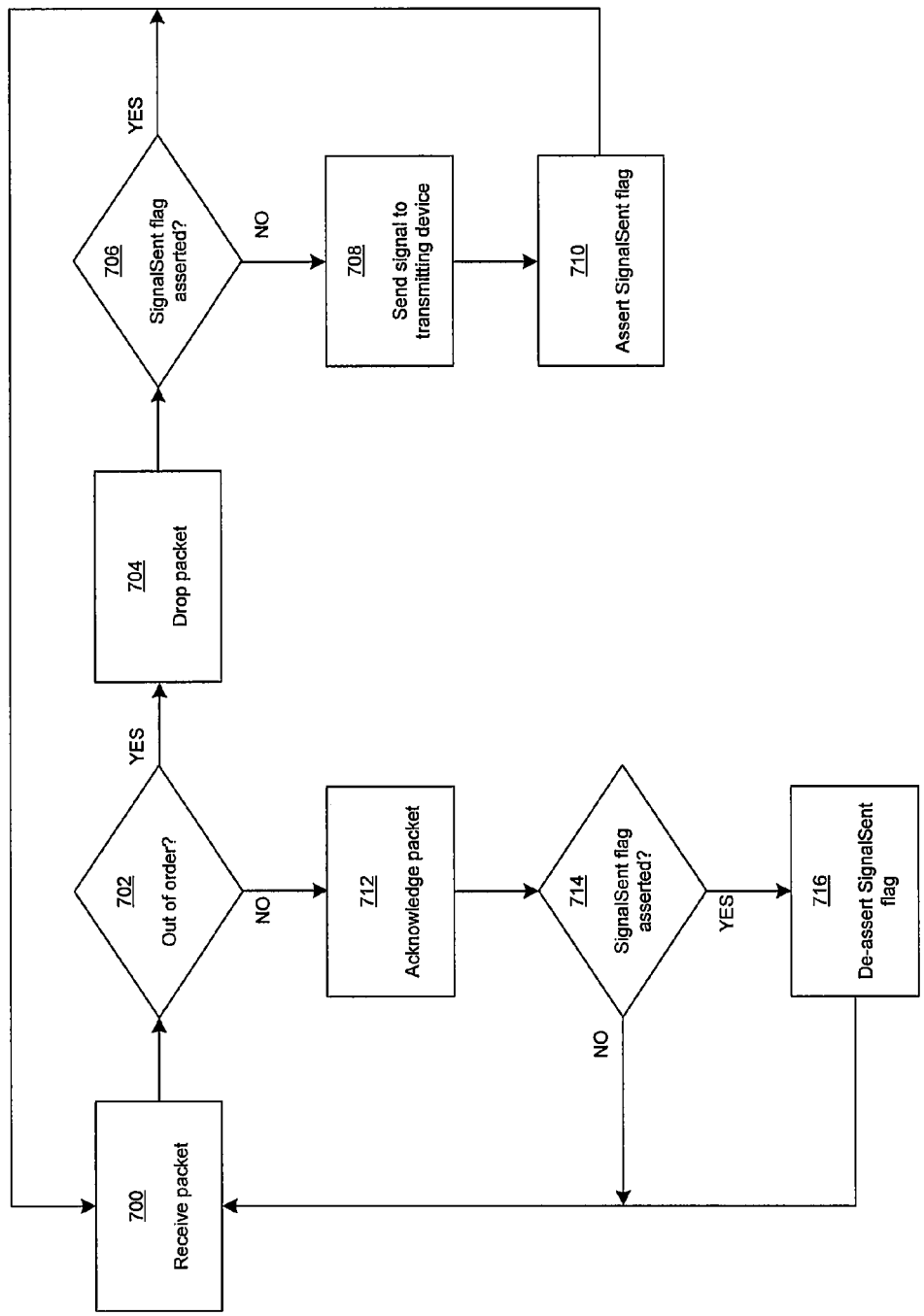
FIG. 7 is a flow diagram illustrating exemplary steps for using the out-of-order signal to alleviate network congestion when isles are not saved, in accordance with an embodiment of the invention.

FIG. 7 is a flow diagram illustrating exemplary steps for using the out-of-order signal to alleviate network congestion when isles are not saved, in accordance with an embodiment of the invention. Referring to FIG. 7, there is shown steps 700 to 716. In step 700, a receiving device, such as, for example, the host 101, which may not save isles of data, may receive a packet. With respect to FIG. 7, the host 101 may also be referred to as the receiving device 101. In step 702, the receiving device 101 may determine whether the received packet may be out of order. This may be accomplished, for example, by checking a packet sequence number. If the packet is out of order, the next step may be step 704. Otherwise, the next step may be step 712.

In step 704, the out-of-order packet may be dropped. In step 706, the receiving device 101 may determine if a SignalSent flag may be asserted. Assertion of the SignalSent flag may indicate that a congestion alleviation signal may have been sent to a transmitting device. If the SignalSent flag is asserted, the next step may be step 700. Otherwise, the next step may be step 708 where a congestion alleviation signal may be sent to a transmitting device, such as, for example, the host 100. With respect to FIG. 7, the host 100 may also be referred to as the transmitting device 100. The congestion alleviation signal may comprise, for example, three acknowledgement signals that may indicate a same packet to retransmit.

The transmitting device 100 may receive the congestion alleviation signal from the receiving device 101, and may enter, for example, a slow start mode without waiting for a retransmission time-out. Accordingly, the transmitting device 100 may transmit data to the receiving device 101 using CWND to determine the number of packets to transmit before waiting for acknowledgements.

In step 710, the receiving device 101 may assert the SignalSent flag to indicate that the congestion alleviation signal may have already been sent. The next step may be step 700.

In step 712, the receiving device 101 may send an acknowledgement for the in-order packet received in step 700. In step 714, the receiving device 101 may determine whether the SignalSent flag may be asserted. If not, the next step may be step 700. Otherwise, the next step may be step 716 where the SignalSent flag may be deasserted. The next step may be step 700.

Figure 8:
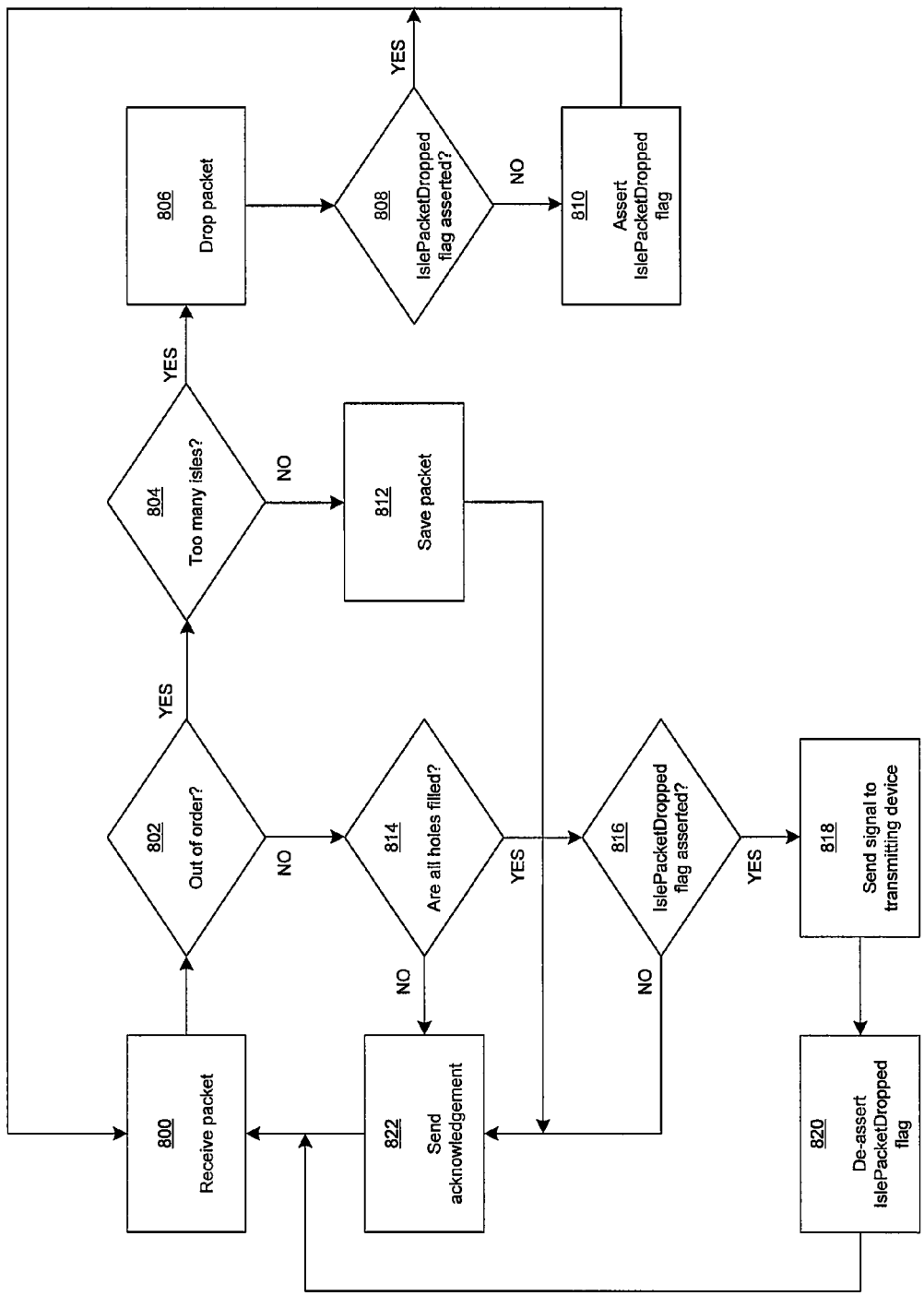
FIG. 8 is a flow diagram illustrating exemplary steps for using the out-of-order signal to alleviate network congestion when one or more isles, but not all isles, are saved but not all isles are saved, in accordance with an embodiment of the invention.

FIG. 8 is a flow diagram illustrating exemplary steps for using the out-of-order signal to alleviate network congestion when one or more isles, but not all isles, are saved, in accordance with an embodiment of the invention. Referring to FIG. 8, there is shown steps 800 to 822. In step 800, a receiving device, such as, for example, the host 101, which may save an isle of data, may receive a packet. With respect to FIG. 8, the host 101 may also be referred to as the receiving device 101. In step 802, the receiving device 101 may determine whether a packet may have been received out of order. This may be accomplished, for example, by checking a packet sequence number. If the received packet is out of order, the next step may be step 804. Otherwise, the next step may be step 814.

In step 804, the receiving device 101 may determine whether a number of isles that is saved is at a maximum number of isles that can be saved. The limitation on the number of isles that can be saved may be, for example, the amount of memory dedicated for connection contexts on a chip that may also comprise, for example, the NIC 110. The connections may be, for example, TCP connections. For example, some embodiments of the invention may allow saving packets for one isle. When a second isle is detected, the packets in that second isle may be dropped. Various embodiments of the invention may allow different number of isles to be saved before dropping packets for subsequent isles.

If the number of isles to be saved is already at the maximum value, the next step may be step 806. Otherwise, the next step may be step 812. In step 806, the received packet may be dropped since no more isles may be saved. In step 808, the receiving device 101 may determine whether the IslePacketDropped flag may be asserted. An asserted IslePacketDropped flag may indicate that an isle packet may have been dropped. If so, the next step may be step 800. Otherwise, the IslePacketDropped flag may be asserted in step 810. The next step may be step 800. In step 812, the packet received in step 800 may be saved in the isle buffer, and the isle information may be updated to indicate start and end of the isles that are saved. The next step may be step 822 where the receiving device 101 may send an acknowledgement. The acknowledgement may indicate that a first packet for a first hole may need to be sent. The transmitting device 100 may then send the appropriate packet as indicated by the latest acknowledgement.

In step 814, the receiving device 101 may determine if all holes may have been filled with in-order packets. Holes may be, for example, dropped packets between groups of in-order packets, or isles. Where all the holes have been filled may be the same as where there are no holes. If all the holes have not been filled, the next step may be step 822. Otherwise, the next step may be step 816, where the receiving device 101 may determine if the IslePacketDropped flag may be asserted. If the IslePacketDropped flag is not asserted, the next step may be step 822. Otherwise, the next step may be step 818, where a congestion alleviation signal may be sent to the transmitting device 100.

The transmitting device 100 may receive the congestion alleviation signal from the receiving device 101, and may enter, for example, a slow start mode without waiting for a retransmission time-out. Accordingly, the transmitting device 100 may transmit data to the receiving device 101 using CWND to determine the number of packets to transmit before waiting for acknowledgements. The initial value of CWND may be, for example, FlightSize/2, where FlightSize may be the number of packets sent without acknowledgements.

The next step may be step 820 where the IslePacketDropped flag may be deasserted. The next step may be step 800. In step 822, which may be reached from the steps 814 and 816, an in-order packet may be acknowledged.

In accordance with an embodiment of the invention, aspects of an exemplary system may comprise, for example, as illustrated with respect to FIGS. 1a, 1b, and 1c, one or more circuits in a receiving device, which may be similar to the hosts 100 and/or 101, on a network that, when out-of-order packets are received, send a signal to a transmitting device, which may also be similar to the hosts 100 and/or 101. As referred to herein, the transmitting device may be referred to as the transmitting device 100, and the receiving device may be referred to as the receiving device 101. The signal may indicate to the transmitting device 100 to enter a congestion alleviation mode without waiting for a time-out period. The signal sent to the transmitting device may comprise a plurality of duplicate ACKs, for example, three duplicate ACKs. The transmitting and receiving devices may also use, for example, TCP for data communication. Accordingly, the receiving device 101 may use a TCP option and/or an available TCP flag for the signal. The receiving device 101 may assert, for example, a signal-sent flag after sending the signal. The receiving device may also de-assert the signal-sent flag when a new packet is received in order.

In instances where the receiving device 101 may save one or more isles, but not all isles, the receiving device 101 may receive retransmitted packets that fill one or more holes between the isles before sending a signal to the transmitting device. The transmitting device 100 may then enter a slow start mode by sending a packet that sequentially follows a last saved isle. The slow start mode may start with a congestion window of CWND=0.5*FlightSize.

Another embodiment of the invention may provide a machine-readable storage, having stored thereon, a computer program having at least one code section executable by a machine, thereby causing the machine to perform the steps as described above for a fast drop recovery for a TCP connection.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will comprise all embodiments falling within the scope of the appended claims.

What is claimed is:

1. A method for handling congestion in a communication system, the method comprising:
    detecting a received out-of-order packet by a receiving device on a network, wherein said receiving device is enabled to save one or more of a plurality of isles, but not all of said plurality of isles;
    determining whether a maximum number of isles are saved by said receiving device;
    communicating an acknowledgement to said transmitting device identifying a hole associated with a missed packet, the acknowledgement requesting retransmission of the missed packet when less than the maximum number of isles are saved by said receiving device;
    dropping the received out-of-order packet when the maximum number of isles are saved by said receiving device; and
    communicating a signal from said receiving device to the transmitting device that sent said received out-of-order packet when the maximum number of isles are saved by said receiving device, wherein said signal indicates to said transmitting device to enter a congestion alleviation mode without waiting for a delay period, said delay period associated with a delayed-Ack time period, said signal further comprising a flag indicating that the out-of-order packet has been dropped.

2. The method according to claim 1, comprising transferring data over said network via TCP.

3. The method according to claim 2, wherein, if said receiving device is not enabled to save said isles, said delay period comprises at least a retransmission time-out period associated with a lack of an acknowledgment for a packet transmitted by said transmitting device.

4. The method according to claim 2, comprising communicating said signal using at least one of: a TCP option or an available TCP flag.

5. The method according to claim 1, comprising sending by said receiving device, a plurality of duplicate ACKs for said signal.

6. The method according to claim 1, comprising asserting by said receiving device a signal-sent flag after sending said signal.

7. The method according to claim 1, comprising de-asserting by said receiving device a signal-sent flag when a new packet is received in order.

8. The method according to claim 1, comprising communicating said signal when said receiving device receives retransmitted packets that fill one or more holes up to a last saved isle.

9. The method according to claim 8, wherein said transmitting device enters a slow start mode based on said communicated signal, with a packet that sequentially follows said last saved isle.

10. The method according to claim 9, comprising initially using by said transmitting device, a CWND=0.5*FlightSize for said slow start mode, where CWND comprises a congestion window and FlightSize comprises a number of packets sent by the transmitting device that have not been acknowledged.

11. A non-transitory machine-readable storage having stored thereon, a computer program executable by a machine and having at least one code section for congestion relief, the at least one code section comprising:
   detecting a received out-of-order packet by a receiving device on a network, wherein said receiving device is enabled to save one or more of a plurality of isles, but not all of said plurality of isles;
   determining whether a maximum number of isles are saved by said receiving device;
   communicating an acknowledgement to said transmitting device identifying a hole associated with a missed packet, the acknowledgement requesting retransmission of the missed packet when less than the maximum number of isles are saved by said receiving device;
   dropping the received out-of-order packet when the maximum number of isles are saved by said receiving device; and
   communicating a signal from said receiving device to the transmitting device that-sent said received out-of-order packet when the maximum number of isles are saved by said receiving device, wherein said signal indicates to said transmitting device to enter a congestion alleviation mode without waiting for a delay period, said delay period associated with a delayed-Ack time period, said signal further comprising a flag indicating that the out-of-order packet has been dropped.

12. The machine-readable storage according to claim 11, wherein-the at least one code section comprises code for transferring data over said network via TCP.

13. The machine-readable storage according to claim 12, wherein, if said receiving device is not enabled to save said isles, said delay period comprises at least a retransmission time-out period associated with a lack of an acknowledgment for a packet transmitted by said transmitting device.

14. The machine-readable storage according to claim 12, wherein the at least one code section comprises code for communicating said signal using at least one of: a TCP option or an available TCP flag.

15. The machine-readable storage according to claim 11, wherein the at least one code section comprises code for sending by said receiving device, a plurality of duplicate ACKs for said signal.

16. The machine-readable storage according to claim 11, wherein the at least one code section comprises code for asserting by said receiving device a signal-sent flag after sending said signal.

17. The machine-readable storage according to claim 11, wherein the at least one code section comprises code for de-asserting by said receiving device a signal-sent flag when a new packet is received in order.

18. The machine-readable storage according to claim 11, wherein-the at least one code section comprises code for communicating said signal when said receiving device receives retransmitted packets that fill one or more holes up to a last saved isle.

19. The machine-readable storage according to claim 18, wherein said transmitting device enters a slow start mode based on said communicated signal, with a packet that sequentially follows said last saved isle.

20. The machine-readable storage according to claim 19, wherein the at least one code section comprises code for initially using by said transmitting device, a CWND=0.5*FlightSize for said slow start mode, where CWND comprises a congestion window and FlightSize comprises a number of packets sent by the transmitting device that have not been acknowledged.

21. A system for congestion relief, the system comprising:
   one or more circuits in a receiving device on a network that are configured to detect a received out-of-order packet, wherein said receiving device is enabled to save one or more of a plurality of isles, but not all of said plurality of isles;
   said one or more circuits further configured to determine whether a maximum number of isles are saved by said receiving device;
   said one or more circuits further configured to communicate an acknowledgement to said transmitting device identifying a hole associated with a missed packet, the acknowledgement requesting retransmission of the missed packet when less than the maximum number of isles are saved by said receiving device;
   said one or more circuits further configured to drop the received out-of-order packet when the maximum number of isles are saved by said receiving device; and
   said one or more circuits further to communicate a signal from said receiving device to the transmitting device that sent said received out-of-order packet when the maximum number of isles are saved by said receiving device, wherein said signal indicates to said transmitting device to enter a congestion alleviation-mode without waiting for a delay period, said delay period associated with a delayed-Ack time period, said signal further comprising a flag indicating that the out-of-order packet has been dropped.

22. The system according to claim 21, wherein TCP protocol is used for data transfer on said network.

23. The system according to claim 22, wherein, if said receiving device is not enabled to save said isles, said delay period comprises at least a retransmission time-out period associated with a lack of an acknowledgment for a packet transmitted by said transmitting device.

24. The system according to claim 22, wherein said one or more circuits enable using at least one of: a TCP option or an available TCP flag for said signal.

25. The system according to claim 21, wherein said one or more circuits enable sending a plurality of duplicate ACKs for said signal.

26. The system according to claim 21, wherein said one or more circuits enable asserting by said receiving device a signal-sent flag after-sending said signal.

27. The system according to claim 21, wherein said one or more circuits enable de-asserting by said receiving device a signal-sent flag when a new packet is received in order.

28. The system according to claim 21, wherein said one or more circuits enable communicating said signal when said receiving device receives retransmitted packets that fill one or more holes up to a last saved isle.

29. The system according to claim 28, wherein said one or more circuits enable said transmitting device entering a slow start mode based on said communicated signal, with a packet that sequentially follows said last saved isle.

30. The system according to claim 29, wherein said one or more circuits enable initially using by said transmitting device, a CWND=0.5*FlightSize for said slow start mode, where CWND comprises a congestion window and Flight-Size comprises a number of packets sent by the transmitting device that have not been acknowledged.

* * * * *